United States Patent [19]
Klinger et al.

[11] Patent Number: 5,542,712
[45] Date of Patent: Aug. 6, 1996

[54] QUICK CONNECTOR HOUSING WITH ELONGATED BARB DESIGN

[75] Inventors: Gary Klinger, Warren, Mich.; Siegfried K. Baier, Reichshof-Ma, Germany

[73] Assignee: ITT Corporation

[21] Appl. No.: 282,859

[22] Filed: Jul. 29, 1994

Related U.S. Application Data

[63] Continuation-in-part of Ser. No. 126,347, Sep. 24, 1993, Pat. No. 5,456,500, which is a continuation-in-part of Ser. No. 809,826, Dec. 18, 1991, Pat. No. 5,297,818, Mar. 22, 1994.

[51] Int. Cl.$^6$ ............................. F16L 35/00; F16L 33/207
[52] U.S. Cl. ............................. 285/93; 285/256; 285/259
[58] Field of Search ............................. 285/93, 259, 256, 285/305, 319

[56] References Cited

U.S. PATENT DOCUMENTS

| | | | |
|---|---|---|---|
| 2,452,908 | 11/1948 | Cowles | 285/259 |
| 4,244,608 | 1/1981 | Stuemky . | |
| 4,522,435 | 6/1985 | Miller et al. | 285/259 |
| 4,589,684 | 5/1986 | Nowacki et al. | 285/319 |
| 4,593,942 | 6/1986 | Loker | 285/259 |
| 4,635,973 | 1/1987 | Sauer | 285/256 |
| 4,653,779 | 3/1987 | Foster | 285/256 |
| 4,660,867 | 4/1987 | Kemper et al. | 285/256 |
| 4,753,458 | 6/1988 | Case et al. . | |
| 4,756,558 | 7/1988 | Beamer . | |
| 4,783,101 | 11/1988 | Peterson et al. . | |
| 4,793,637 | 12/1988 | Laipply . | |
| 4,834,423 | 5/1989 | Deland | 285/319 |
| 4,895,396 | 1/1990 | Washizu . | |
| 4,906,030 | 3/1990 | Yokomatsu et al. | 285/256 |
| 4,913,467 | 4/1990 | Washizu . | |
| 4,915,420 | 4/1990 | Washizu . | |
| 4,919,457 | 4/1990 | Moretti . | |
| 4,925,217 | 5/1990 | Ketcham . | |
| 4,946,205 | 8/1990 | Washizu . | |
| 4,948,176 | 8/1990 | Bartholomew . | |
| 4,979,765 | 12/1990 | Bartholomew . | |
| 5,002,315 | 3/1991 | Bartholomew . | |
| 5,044,671 | 9/1991 | Chisnell et al. | 285/256 |
| 5,080,404 | 1/1992 | Saur | 285/256 |
| 5,135,268 | 8/1992 | McNaughton et al. . | |
| 5,152,555 | 10/1992 | Szabo . | |
| 5,178,424 | 1/1993 | Klinger . | |
| 5,215,339 | 6/1993 | Morse et al. | 285/256 |
| 5,226,230 | 7/1993 | Klinger . | |
| 5,226,679 | 7/1993 | Klinger . | |
| 5,228,728 | 7/1993 | McNaughton . | |
| 5,297,818 | 3/1994 | Klinger . | |
| 5,342,099 | 8/1994 | Bahner et al. . | |
| 5,423,577 | 6/1995 | Ketcham | 285/319 |
| 5,441,313 | 8/1995 | Kalahasthy | 285/319 |

FOREIGN PATENT DOCUMENTS

| | | | |
|---|---|---|---|
| 0505930A3 | 9/1992 | European Pat. Off. . | |
| 4003461 | 8/1990 | Germany . | |
| 1148191 | 6/1988 | Japan . | |
| 2205136 | 11/1988 | United Kingdom | 285/319 |
| 2216213 | 10/1989 | United Kingdom . | |

*Primary Examiner*—Eric K. Nicholson
*Attorney, Agent, or Firm*—Dykema Gossett PLLC

[57] ABSTRACT

A quick connector housing element includes an elongated barb design for coupling the female housing to a tubing member. The elongated barb design includes a generally cylindrical sealing surface proximate a terminal end of the female housing. The sealing surface of the elongated barb enhances sealing properties between the female housing and the tubing and provides other advantages especially in connection with the use of multilayer tubing. Further, an O-ring is disposed about the sealing surface to provide a better seal.

6 Claims, 6 Drawing Sheets

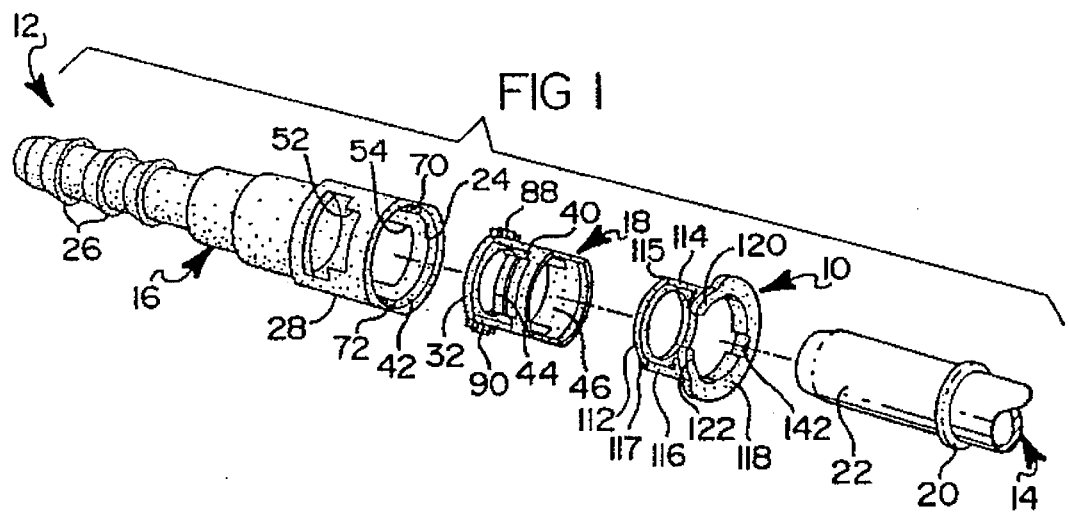
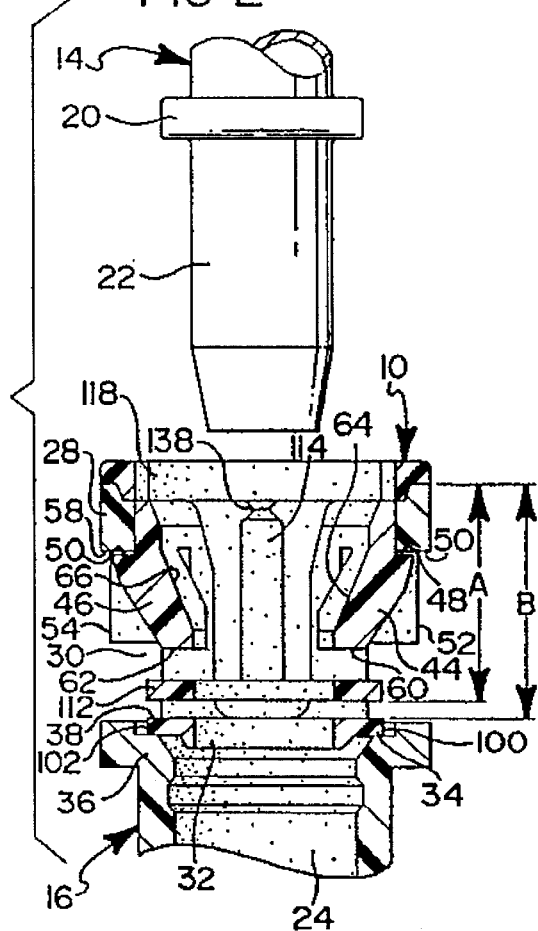
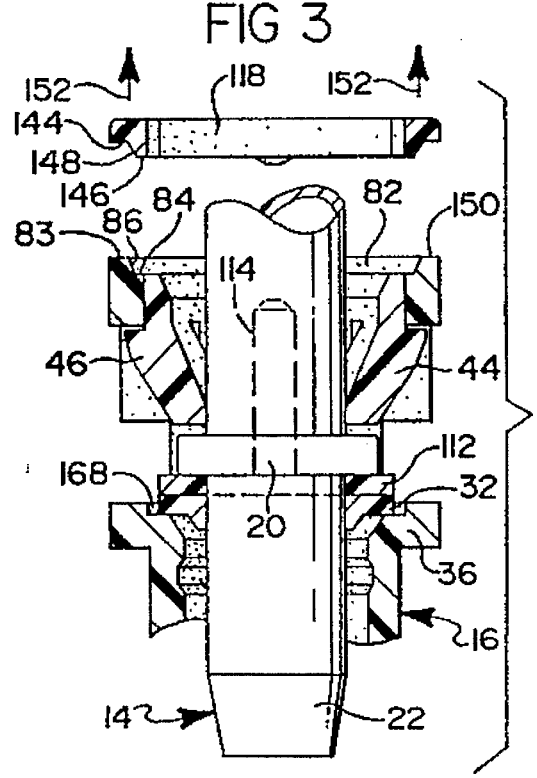

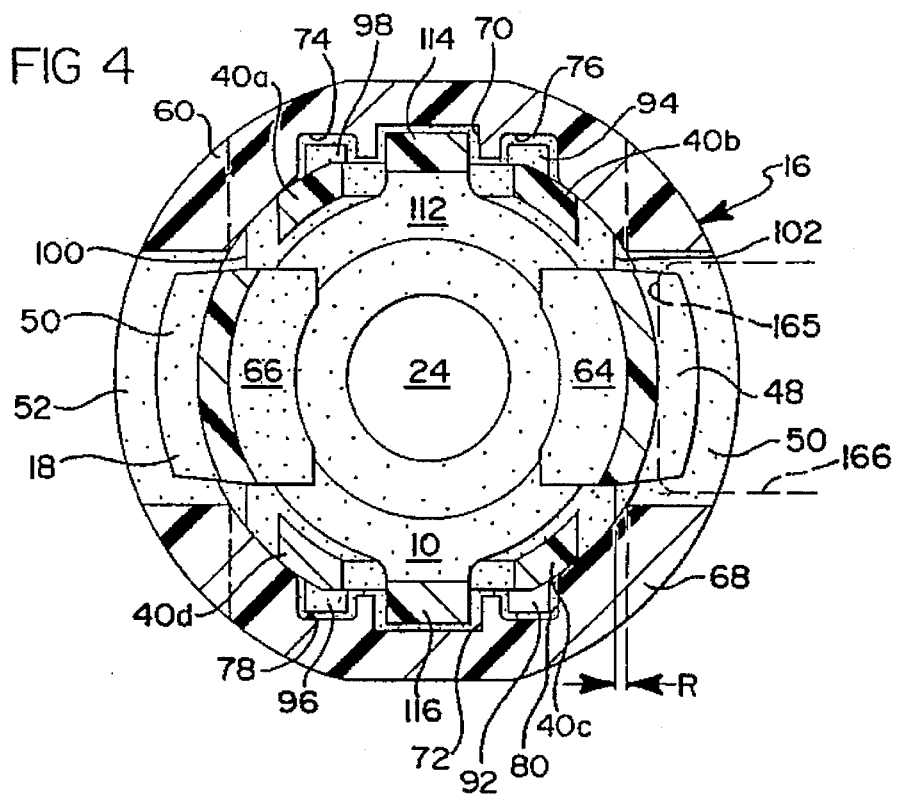
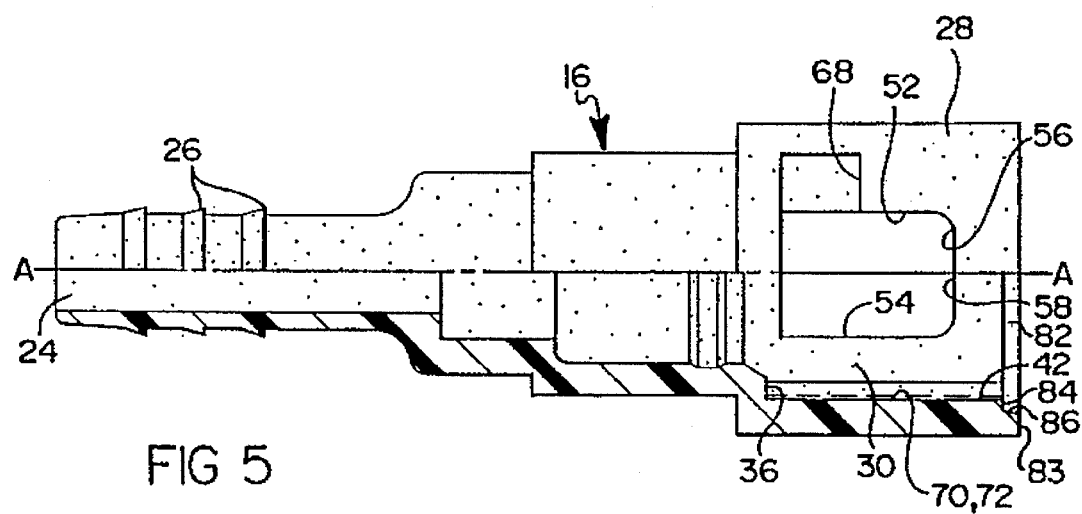

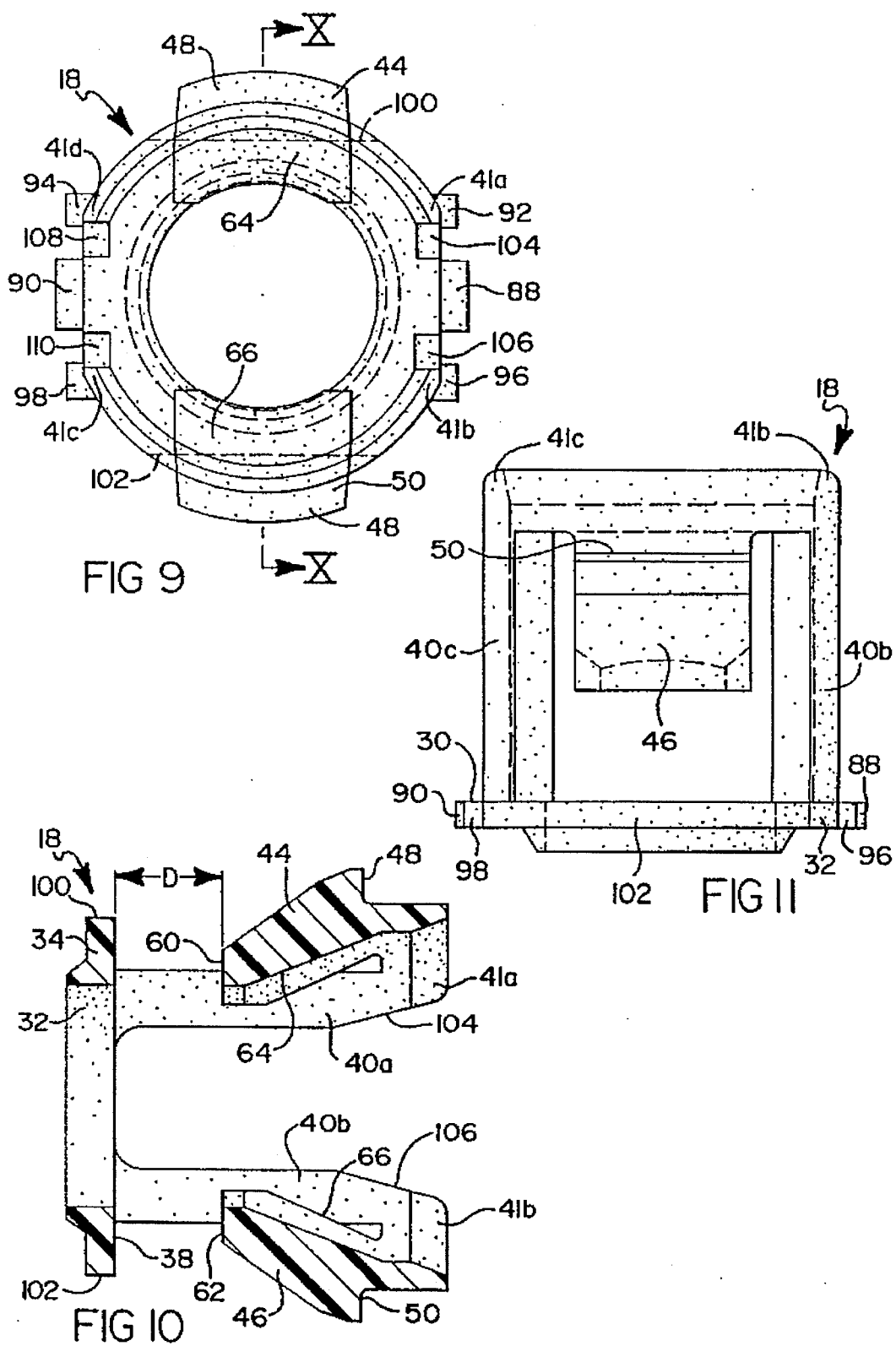

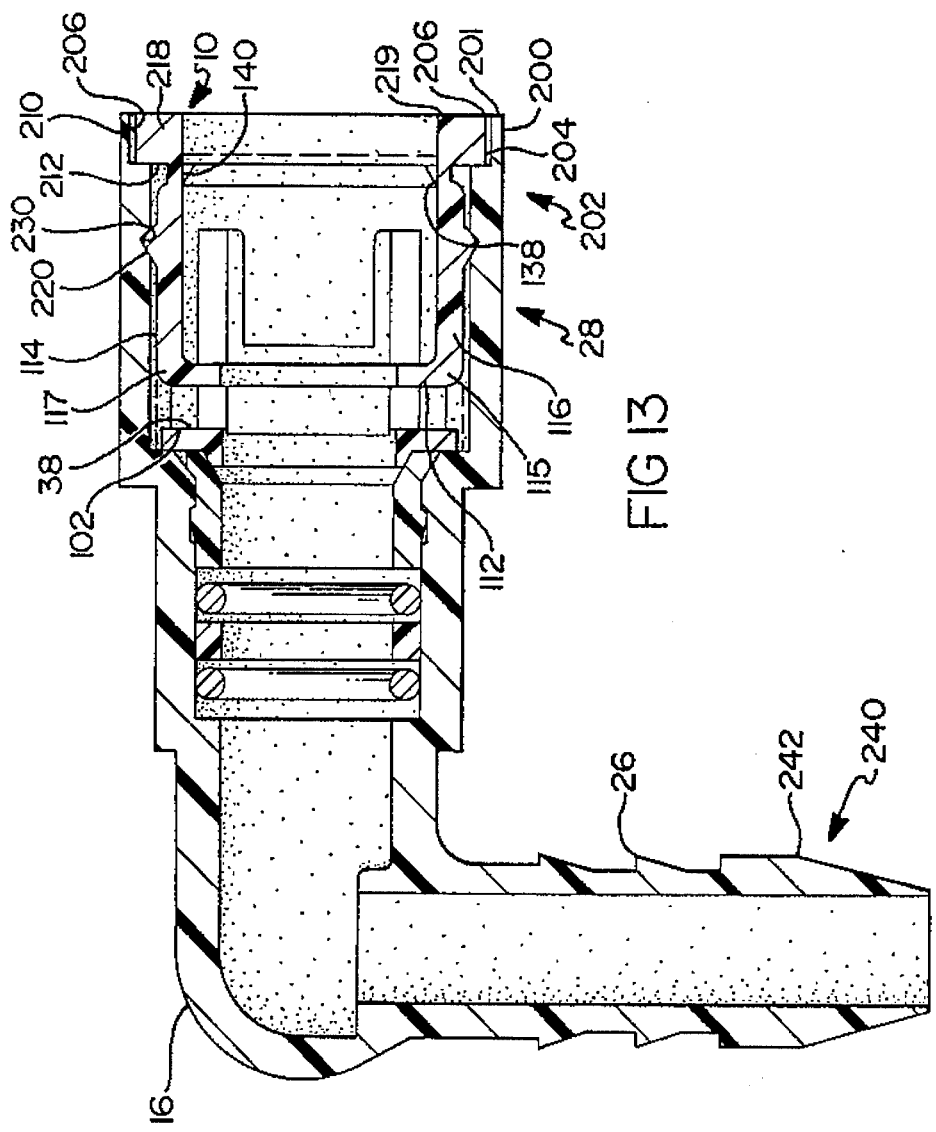
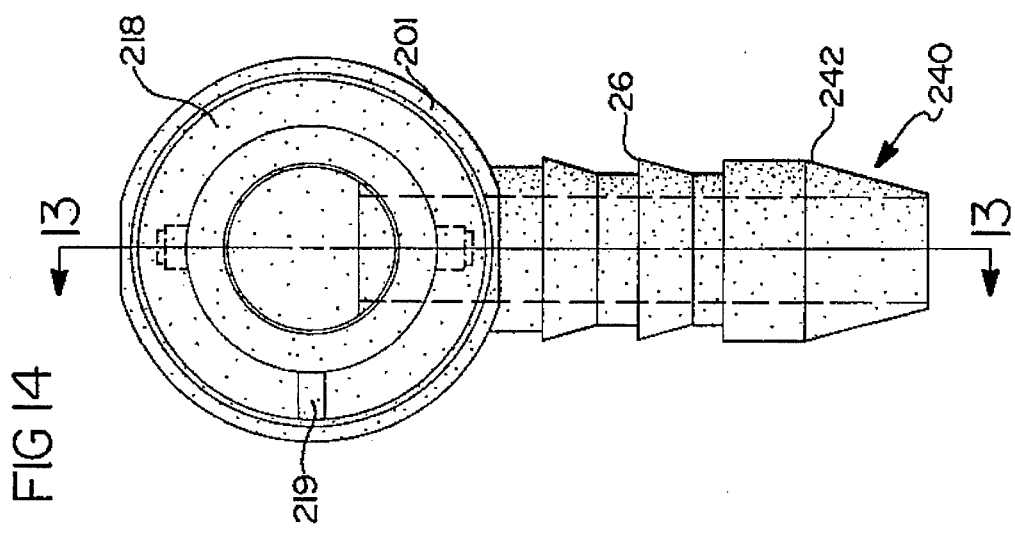

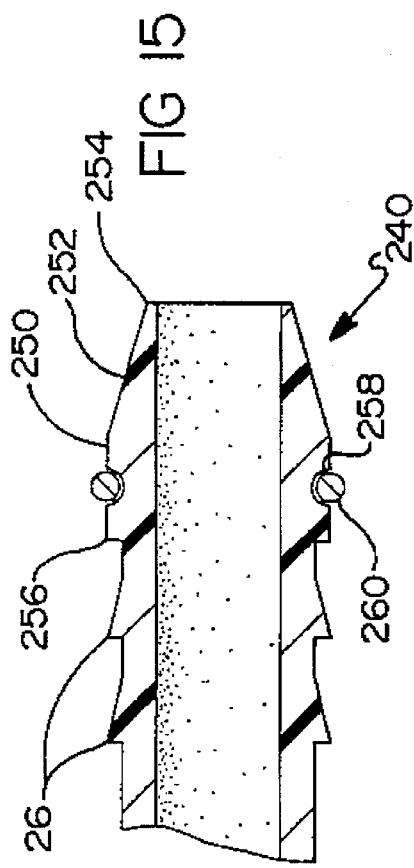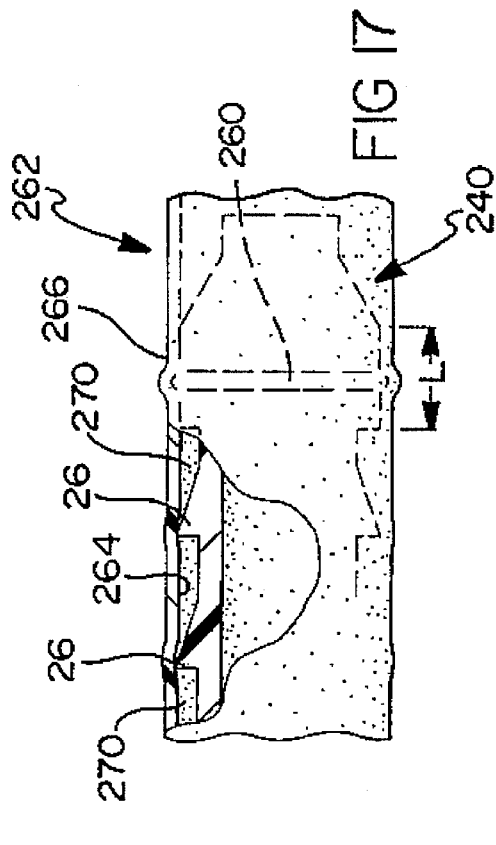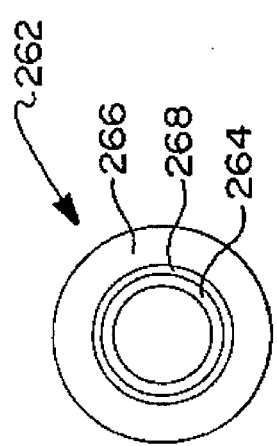

QUICK CONNECTOR HOUSING WITH ELONGATED BARB DESIGN

This application is a continuation-in-part of the application having Ser. No. 126,347, filed Sep. 24, 1993, now U.S. Pat. No. 5,456,500 which is a continuation-in-part of application Ser. No. 809,826, filed Dec. 18, 1991, now U.S. Pat. No. 5,297,818, issued Mar. 22, 1994 and having the same assignee of interest.

FIELD OF THE INVENTION

The present invention relates to a female housing for use in quick connector assemblies and, more particularly, to quick connector housings having an improved barb design to improve the seal established between the housing and a tubing element.

CROSS-REFERENCE

This invention is related to U.S. Pat. No. 5,178,424, issued Jan. 12, 1993, entitled "Pop-Off Quick Connect Indicator" having the same assignee of interest as this application. U.S. Pat. No. 5,178,424 is hereby incorporated within this specification by reference.

BACKGROUND OF THE INVENTION

It is desirable in fluid handling conduits to ensure that the connectors used have their male and female portions properly coupled together. A faulty connector enables an associated host system to leak fluid. This can be particularly disadvantageous when the system is under pressure and the leaking connector expels the pressurized fluid.

In the quick connector field, where male and female portions of the connectors are held together by friction locking members, it is important that the male and female portions be properly coupled. To ensure proper coupling, the installer may tug on or manipulate the connector to make sure that it is fully engaged. Also, visual types of inspecting devices enable the installer to confirm that the male and female portions are properly coupled together from observation alone.

U.S. Pat. No. 4,925,217, issued to Ketcham, discloses a quick connector with a visual checking feature having a deformable member assembled within the fitting that includes elongated members extending out of the housing between the male and female portions prior to coupling and that are retracted, and no longer visible, once the coupling has been accomplished. Although this type of connector may work satisfactorily for its intended purpose, designers are always trying to improve the field. Furthermore, designs such as that employed by Ketcham provide only relatively small axial movement of the indicator member, which, when employed with relatively low cost, high tolerance manufacturing, limits the reliability of the perceived indication and, alternatively, adds additional expense to a more highly refined design. Lastly, the spring-like operation of Ketcham's vaulted annular member requires use of relatively expensive materials and can introduce additional failure modes, such as fracture of one of the legs, which could interfere with proper coupling operation.

A related problem stems from dual aspects of commercially available quick connect devices, to wit: high volume and low sale price frequently necessitating the use of inexpensive, somewhat pliable materials, and complex contours of extremely small inter-fitting components. These aspects collectively increase the likelihood of mis-assembly. High volume production techniques, including automated assembly tends to aggravate the problem wherein mis-assembly or impermissible dimensional variations of the components is difficult to detect.

Further problems may be encountered when using conventional quick connect devices with multilayer tubing. Multilayer tubing is utilized to meet current government standards in fluid handling. Conventional devices may not always be compatible with multilayer tubing in that a proper seal is not necessarily maintained and some devices will potentially damage the integrity of the tubing.

SUMMARY OF THE INVENTION

Accordingly, it is an object of this invention to provide a visual inspection device that enables, at a glance, an installer to ensure proper coupling of the connector. This invention also provides the art with a simple, inexpensive inspection device that overcomes the shortcomings of the prior art described above.

In its most general terms, this invention provides a connector housing for use within a quick connector assembly. The housing has a generally cylindrical housing body that has a first end adapted to receive a male member, such as a conduit. A second end of the housing body is adapted to be coupled with tubing. The second end preferably has an elongated barb at a portion that is most distal from the first end of the housing body. The elongated barb has a ramp surface that begins at a terminal point on the distal portion of the housing body and ends adjacent a land. The land extends away from the ramp surface to a first engaging surface on the second housing end. This first engaging surface is adapted to bear against a portion of an inner surface on the tubing such that the tubing is maintained in a properly coupled relationship with the connector housing.

In the preferred embodiment, the ramped surface is essentially conical and the land is essentially cylindrical. A further improvement on the preferred embodiment includes providing a circumferential groove on the land. A circumferential groove is adapted to nestingly receive and maintain an O-ring in a fixed longitudinal position upon the quick connector housing. The land acts as a sealing surface for maintaining a proper seal between the inner surface of the tubing and the connector housing second end. Placing a rubber O-ring within a circumferential groove on the land serves to enhance the seal maintained by the inventive connector housing.

The inventive connector housing, which includes the elongated barb design, is especially useful in situations where multilayer plastic tubing is required. Recent government standards require the use of multilayer plastic tubing for reducing evaporation or permeation of vapors or liquids from fuel handling lines. The introduction of multilayer plastic tubing requires a quick connector assembly that can compensate for the higher hoop strength of the tubing (compared to conventional monowall nylon tubing) and the difficulties that are otherwise encountered in trying to maintain the proper seal.

The elongated barb design of this invention provides a quick connector system that is more easily applied in multilayer tubing applications. The elongated barb includes the land or sealing surface that provides more surface area for contact with the inner layer of the multilayer tubing. This provides enhanced sealing qualities and further, reduces the risk of an undesirable puncture or tear to the innermost layer of the multilayer tubing.

The preferred embodiment of this invention includes an O-ring disposed about the land for enhancing a circumferential seal between the tubing and the connector housing. The O-ring provides further sealing qualities that is especially advantageous in applications where the tubing has Teflon™ as the innermost layer, for example.

The inventive quick connector assembly includes a generally cylindrical connector housing defining an axial opening for matingly receiving a male member. A retainer disposed substantially within the housing releasably interconnects the connector housing and male member. An insertion indicator also disposed substantially within the housing is displaced axially upon interconnection of the connector housing and male member to provide a visual indication of the interconnection. Finally, index means rotationally fixes the retainer and insertion indicator with respect to the connector housing while allowing a limited freedom of relative axial movement therebetween. This arrangement has the advantage of permitting high speed automated pre-assembly of the female portion of the quick connector while ensuring against mis-alignment or mis-assembly thereof and eliminates the need for external alignment members.

In a broad sense, a quick connect insertion indicator designed in accordance with this invention includes a generally annular indicator member that is positioned substantially adjacent to and within the opening of the housing and releasably engaged with leg members. Finally, means are provided operative to axially displace the base member upon engagement of the conduit and connector housing to effect separation of the base and indicator members. Guide means provide concentric positioning of the indicator member with the housing opening until coupling of the connector is complete.

In one embodiment of the invention, the insertion indicator includes an annular base member and two circumferentially spaced axially elongated leg members dimensioned such that the leg members terminate internally adjacent a step formed at the axial housing opening. Guide means are provided to maintain concentric positioning of the indicator member as least partially within the housing opening. The base member defines an abutment surface disposed to engage a mating abutment surface defined by the conduit to axially displace the base and leg members upon engagement of the conduit and connector housing to effect simultaneous separation of the base and indicator members. This arrangement provides the advantage of minimizing the overall axial length of the quick connect fitting to enhance packaging thereof and avoids inadvertent release by requiring a special release tool.

According to another aspect of the invention, the insertion indicator defines axially elongated guide surfaces operative to engage axially elongated guide slots formed within the connector housing and radial projections on the guide surfaces that nest within radially defined grooves within the connector housing to prohibit relative rotational and undesirable axial displacement therebetween, respectively. This arrangement provides for precise positioning of the insertion indicator within the female housing to minimize the chance of mis-assembly or distortion of the components during coupling engagement. The slots and guide surfaces ensure that only desirable relative axial displacement takes place during the engagement process and that rotation and skewing of the components will not occur.

According to another aspect of the invention, the guide slots are recessed within the internal dimension walls of the female member to receive the leg members, which are of generally rectangular cross-section and define the guide surfaces. The leg members are disposed substantially radially externally of the outer diameter surface of the base member. Furthermore, the retainer comprises a pair of opposed radially outwardly directed indexing tabs that are slidingly received within the guide slots. This arrangement provides the advantage of simultaneously aligning the retainer and the insertion indicator elements within the female housing.

According to still another feature of the invention, the base and leg members are formed integrally with the indicator member wherein either the indicator member or the leg members include predetermined weakened points, such as by reduced cross-sectional area that will simultaneously predictably fracture upon axial loading occasioned by coupling between the conduit and its mating connector housing.

These and other features and advantages of this invention will become apparent upon reading the following specification that, along with the drawings, describes and discloses preferred and alternative embodiments of the invention in detail.

BRIEF DESCRIPTION OF THE DRAWINGS

FIG. 1, is a perspective exploded view of a conduit quick connect assembly.

FIG. 2, is a broken, cross-sectional view, on an enlarged scale, of a de-mated connector housing and male conduit.

FIG. 3, represents the connector housing and male conduit of FIG. 2 in the coupled condition.

FIG. 4, is a cross-sectional view, on an enlarged scale, taken on lines IV—IV of FIG. 2.

FIG. 5, is a quarter cross-sectional view of the female housing of FIG. 2 taken from the top.

FIG. 9, is a top plan view of a retainer employed with the present invention.

FIG. 10, is a cross-sectional view taken on lines X—X of FIG. 9.

FIG. 11, is a front plan view of the retainer of FIG. 9.

FIG. 13, is a cross-sectional view, of a de-mated connector housing in a presently preferred embodiment.

FIG. 14, is a side plan view of the embodiment illustrated in FIG. 13.

FIG. 15, is a cross-sectional view of a portion of a connector housing highlighting the elongated barb design.

FIG. 16, is a cross-sectional view of multilayer tubing.

FIG. 17, is a partial cut-away, cross-sectional view of a presently preferred embodiment of a connector housing within a portion of a multilayer tubing element.

DETAILED DESCRIPTION OF THE PREFERRED AND ALTERNATIVE EMBODIMENTS

Figure 6:
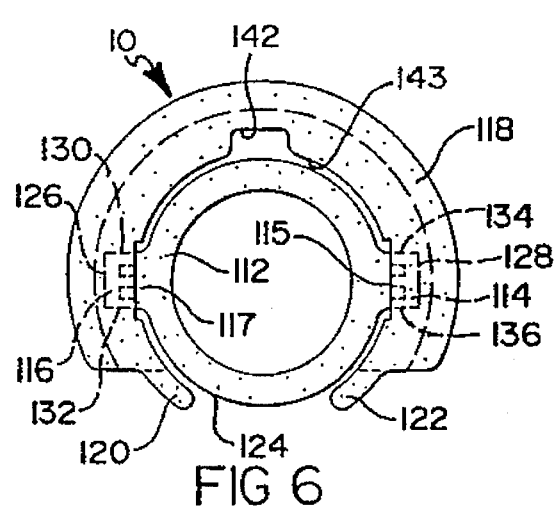
FIG. 6, is a top plan view of the preferred quick connect insertion indicator.

Referring to FIG. 1, this invention includes an insertion indicator device, shown generally at 10, for use with a quick connector, shown generally at 12, including male and female elements 14 and 16, respectively, and a locking member or retainer 18. With the exception of modifications described hereinbelow, quick connector 12 is representative of known commercially available devices. The quick connector 12 illustrated herein is adapted for application within systems employing tubular conduit, although it is contemplated that the present invention could be employed with other structural configurations and applications.

Male element 14 is illustrated as a thin wall metallic tube with an upset or external circumferential flange 20 integrally formed thereon adjacent an open-end 22 adapted for insertion within a stepped through-passage 24 in female element 16. The end of female element 16 distal male element 14 has a series of external circumferential barbs 26 adapted for locking engagement with a resilient conduit (not illustrated). Locking member 18 is carried within an enlarged end 28 of female element 16 proximate male element 14 as will be described in greater detail hereinbelow.

As seen in FIG. 2, the through-passage 24 of female element 16 includes a stepped portion 30 within its enlarged end 28. Additional stepped portions may be provided to receive elements such as O-rings or the like (not illustrated) for sealing male element 14 within female element 16.

As best viewed in FIGS. 2 and 9–11, retainer 18 comprises a generally annular base portion 32 nestingly disposed concentrically within through-passage 24 terminating in a radially outwardly extending flange portion 34 received within a step 36 formed in female element 16 opening into stepped portion 30 and co-acting therewith to define a seat 38. Four (4) extensions 40a–d are integrally formed with base portion 32 and are circumferentially equally spaced thereabout and extend axially therefrom towards an opening 42 defined by the end of female element 16 for receiving male element 14. Locking member 18 defines two (2) inwardly directed male element engaging fingers 44, 46 depending from adjoining pairs of free ends (40a,d and 40b,c) of extensions 40. Fingers 44, 46 define radially outwardly directed abutment surfaces 48, 50 formed thereon which lockingly engage with one of a pair of opposed radial openings 52, 54 formed in female element 16. The uppermost (in FIG. 2), lateral surfaces of element 16 defining openings 52, 54 are designated as abutment surfaces 56, 58 which meetingly engage surfaces 48, 50 of retainer 18. The axially opposed ends of fingers 44, 46 define radially extending abutment surfaces 60, 62, which are, in assembly, axially spaced from seat 38 by a dimension "D" as will be described in detail hereinbelow. Fingers 44, 46 define radially inwardly tapered ramp surfaces 64, 66, extending through their axial length.

Both female element 16 and retainer 18 are made of injection molded plastic or other suitable material. Quarter cross-sections are employed in FIG. 5 for simplicity inasmuch as the structure is substantially symmetrical about the centerline axis A—A of female element 16. Lastly, certain interior components that typically would be employed with female element 16, such as sealing O-rings and spacers which normally would be disposed within through-passage 24, are deleted here for the sake of brevity.

Aligned pairs of tangential slots 68 formed in the outer surface of female element 16 open into radial openings 52, 54 as is described in co-pending application U.S. Ser. No. 07/675,374, filed Mar. 16, 1991, entitled "Quick Connect Insertion Indicator Clip", assigned to the same assignee of interest, which is incorporated herein by reference.

Referring to FIGS. 4 and 5, stepped portion 30 of female element 16 has complementary circumferentially opposed axially elongated guide grooves 70, 72 formed in the inner-diameter surface of end 28 and opening into through-passage 24. Grooves 70, 72 are rotationally positioned approximately 90 degrees offset from radial openings 52, 54. Laterally opposed side grooves 74, 76 straddle groove 70, extending axially through stepped portion 30 and opening into through-passage 24. Likewise, side grooves 78, 80 are axially parallel to and straddle groove 72 and open radially into through-passage 24.

Opening 42 defines a stepped annular groove 82 composed of an axial outwardly facing abutment surface 84 and radially outwardly diverging alignment surface 86.

Figure 8:
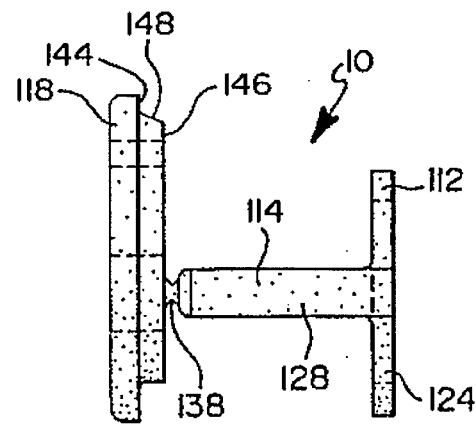
FIG. 8, is a side plan profile view of the insertion indicator of FIG. 6.
Figure 7:
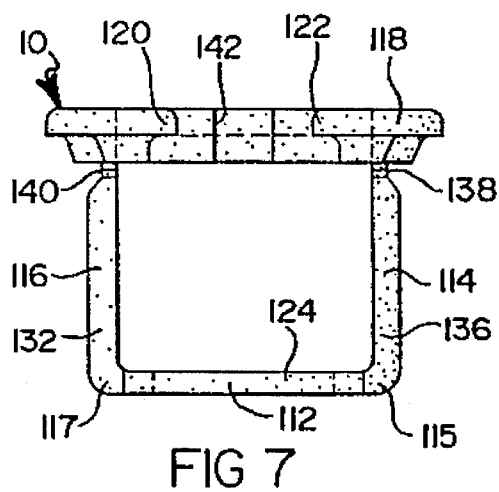
FIG. 7, is a front plan view of the insertion indicator of FIG. 6.

Referring to FIGS. 9 through 11, the structural details of retainer 18 are illustrated. Indexing tabs 88, 90 integrally formed with flange portion 34 of base portion 32 extend radially outwardly therefrom and are dimensioned to slip-fit within guide grooves 70, 72. Likewise, laterally spaced tangential indexing tabs 92, 94, 96, and 98, extend radially outwardly generally parallel to tabs 88, 90. Tabs 92 through 98 are, likewise, dimensioned to fit within their respective grooves 74 through 80. Flats or reliefs 100, 102 are formed in the circumferential wall of flange 34 in locations 90 degrees tangentially offset from tabs 88, 90 and are spaced radially inwardly of the inside diameter surface portion of end 28 which defines radial openings 52, 54 to ensure that flange 34 does not interfere with the use of an O.D. release tool as it penetrates openings 52, 54 to effect release of retainer 18 from female element 16. As best depicted in FIGS. 2 and 4, an O.D. release tool 166 shown in FIG. 4 in phantom will radially depress fingers 44, 46 inwardly until the radially outermost edges of abutment surfaces 48, 50 are radially inwardly spaced from the innermost edges of abutment surfaces 56, 58 to effect release. Typical prior art retainers had a constant radius flange which could interfere with the axially innermost transverse surface 165 of tool 166 and prevent release. The local radial clearance 168 (designated R in FIG. 4) provided by flats 100, 102 allows removal of retainer 18 with tool 166 still in place. Ideally, the radially outer surfaces of flats 100, 102 are disposed substantially inwardly of the innermost radial edges of abutment surfaces 56, 58. A further understanding of the present invention's interrelationship with tool 166 can be gleaned from US. Pat. No. 5,226,230, entitled "Universal O.D. Release Tool" issued Jul. 13, 1993 and having the same assignee as the present invention. U.S. Pat. No. 5,226,230 is hereby incorporated by reference. Tapered clearance relief surfaces 104, 106, 108, and 110 are formed in extensions 40 to prevent binding between male element 14 and retainer 18 during release. Lastly, the overall axial length of extensions 40a–d is abbreviated whereby the free ends 41a–d thereof distal base portion 32 are dimensioned to terminate adjacent abutment surface 84 of female element 16. Referring to FIGS. 6 through 8, the structural details of inventive insertion indicator device 10 are illustrated. Indicator device 10 is constructed integrally from injection molded plastic or other suitable material and includes a generally annular base member 112, two circumferentially opposed axially elongated leg members 114, 116 and a generally annular indicator member 118. Base member 112 has a characteristic outside diameter equal to or slightly less than the lateral spacing of flats 100, 102 to prevent interference with surface 165 of tool 166. Indicator member 118 has an approximately 90 degree circumferential section removed, rendering it U shaped, and defining a permanent opening between circumferential fingers 120, 122 which are spaced approximately one half of the diameter of male element 14 to ensure that after coupling, indicator member 118 remains engaged with its associated male element 14 until it is intentionally removed therefrom. The radially innermost surfaces of leg members 114, 116, are tangentially integrally joined with necks 115, 117 formed on the outer diameter circumferential surface 124 of base member 112 and extend radially outwardly therefrom. Leg members 114, 116 are generally rectangular in cross-section and define opposed radially outwardly facing guide surfaces 126, 128, as well as opposed lateral guide surfaces 130 through 136. Each leg member 114, 116 extends from base member 112 to an opposed end which is integrally formed with indicator member 118. The point of interface between leg members 114, 116 and indicator member 118 forms a necked region 138, 140 which are preferably dimensioned identically to ensure as close as possible equal pull-apart strength.

Indicator member 118 includes a generally rectangular recess 142 formed in the inner diameter surface 143 thereof. Indicator member 118 has a stepped typical cross-section defined by a rightwardly facing (as viewed in FIG. 8) radially outwardly extending circumferential abutment surface 144 and a right-hand most inner abutment surface 146 interconnected by a circumferential tapered fillet 148.

Quick connector 12 and indicator device 10 are provided with a system of guide surfaces that facilitates automated assembly and substantially reduces the likelihood of mis-assembly or component damage resulting from the assembly process. Grooves 70 through 80 interact with indexing, tabs 88 through 98 on retainer 18 as well as leg members 114, 116 of indicator device 10 to provide positive indexing therebetween to ensure against rotational mis-positioning. Multiple, laterally spaced sets of grooves 74, 70, 76 and 78, 72, 80 are provided to enhance the purchase of retainer 18 (via tabs 98, 90, 94 and 96, 88, 92, respectively) upon female element 16 to further reduce the likelihood of rotational mis-positioning by increasing the characteristic maximum chord dimension from the central axis. Because grooves 70 through 80 extend axially the entire length of end 22 of female element 16, they afford proper indexing of retainer 18 and indicator device 10 during the entire assembly process wherein retainer 18 and then indicator device 10 are sequentially axially inserted into female element 16 through opening 42. When fully inserted, base portion 32 of retainer 18 abuts step 36 of female element 16 and abutment surfaces 48, 50 of engaging fingers 44, 46 resiliently expand into radial openings 52, 54 to provide a lock-fit therebetween. Thereafter, as indicator device 10 is inserted, its base member 112 ramps axially along abutment surfaces 64, 66, momentarily resiliently displacing fingers 44, 46 radially outwardly until base member 112 is axially intermediate abutment surfaces 60, 62 and seat 38. Thus, indicator device 10 is positively retained within female element 16 by retainer element 18. Indicator device 10 insertion is complete when indicator member 118 surfaces 144, 146 and 148 abut female element 116 surfaces 83, 84 and 86, respectively. The radially extending surface of base member 112 facing abutment surfaces 60, 62, defines a seat for the leading edge of flange 120 of male element 14. It is thus, essential that dimension D as best seen in FIG. 2, provide for tolerance stack-up of axial dimension of flange 20, base member 112 and base portion 32.

Grooves 70, 72 are radially deep enough to substantially receive the section of leg members 112, 114 to ensure clearance for the insertion of male element 14 while maintaining axial freedom of movement of base member 112.

As best viewed in FIG. 2, indicator device 10 is illustrated in a first condition indicative of non-engagement between male and female elements 14 and 16. The leg members 114, 116 extend axially toward opening 42 to engage indicator member 118 such that abutment surface 144 of indicator member 118 abuts the upward most portion 83 (upward most as viewed in FIGS. 2 and 3) portion or transverse face 150 of female element 16. A substantial portion of indicator member 118 nests within groove 82 with abutment surface 146 abutting abutment surface 84 and alignment surface 86 following the contour of fillet 148 to effect a self-centering of indicator member 118 within opening 42.

Leg members 114, 116 are provided with a characteristic length which, in the pre-coupling condition illustrated in FIG. 2, suspends base member 112 axially from seat 38 of base portion 32 of retainer 18. Because surfaces 126 through 136 are in intimate sliding relationship with respect to grooves 170 through 180, base member 112 is secured from rotation or skewing prior to during and after the coupling process of quick connector 12.

Referring to FIGS. 2 and 3, during the mating process of connector 12, end portion 22 of male member 14 enters through-passage 24, passing through the inner-diameter of both indicator and base members 112 and 118 of indicator device 10 and base portion 32 of retainer 18. Flange 20 of male element 14 is dimensioned to axially ramp along surfaces 64, 66 of fingers 44, 46 until the trailing edge thereof passes abutment surfaces 60, 62, at which point fingers 44, 46 will resiliently snap radially inwardly to entrap flange 20 in its position as illustrated in FIG. 3. As the insertion process continues, the leading (lowermost) edge of abutment flange 20 contacts the upwardmost abutment surface of base member 112. Further downward displacement of male element 14 will carry base member 112 of insertion device 10 therewith. In so doing, leg members 114, 116 will be placed in tension, causing fracture thereof at neck regions 138, 140. Because indicator device 10 is positionally controlled during the coupling process, fracturing at neck regions 138, 140, is extremely predictable and takes place virtually simultaneously. This is in marked contrast to earlier designs in which one leg often would separate prior to the other causing the base member 112 to become distorted and possibly prevent full engagement of quick connector 12. Insertion is complete when the leading (lowermost) edge of base member 112, driven by circumferential flange 20, abuts seat 38. At this point, the trailing edge of flange 20 is passed downwardly past abutment surfaces 60, 62, of finger members 44, 46, which then snap radially inwardly, entrapping flange 20 as well as base member 112 of indicator device 10 in its designated installed position as illustrated in FIG. 3.

As shown in FIG. 2, the axial spacing (B-A) between the lowermost surface of base member 112 and the uppermost surface of seat 38 must be sufficient to accommodate a small degree of resiliency inherent in the material from which indicator device 10 is formed and ensure rupture at neck regions 138, 140. Upon such rupture, the tensional loading of leg members 114, 116 vill cause a snap-back reaction as indicated by arrows 152, causing indicator member 118 to be actually ejected axially away from female element 16. Thereafter, it will be loosely retained on the portion of male element 14 leading away from the coupling in such a manner as to be clearly indicative of separation and thus a complete coupling has taken place. Alternately, indicator member 118 can be removed by grasping it about its peripheral surface and resiliently distorting fingers 120, 122 for removal from male element 14. Recess 142 has a secondary function in that it creates a weakened or hinge point to enhance removal of indicator 25 member 118 from male element 14.

Figure 12:
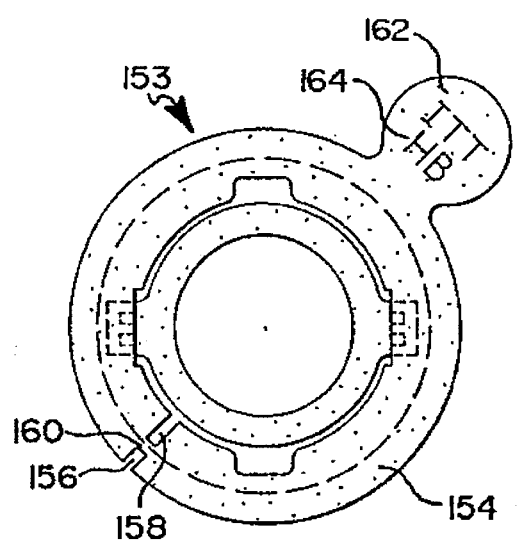
FIG. 12, is a top plan view of an alternative embodiment of the quick connect insertion indicator of the present invention.

Referring to FIG. 12, an alternative embodiment of an indicator device 156 is illustrated which differs only in that an associated indicator member 154 is completely annular and is contemplated for applications where it may be desirable to allow it to permanently encircle male element 14 throughout the life cycle of the fitting. Indicator member 154 is provided with radial slits 156, 158 with only a thin section of web 160 remaining therebetween. If removal is desired, indicator member 154 can be removed by gripping it manually or with a tool and pulling radially away from male element 14, rupturing web 160 in the process. Removal is further enhanced by a provision of a generally planer finger tab 162 extending radially therefrom which is integrally formed with indicator member 154 of indicator device 153 and optionally provided with instructional indicia 164. The remainder of the construction of indicator device 153 is as vas described with reference to the preferred embodiment illustrated in detail in FIGS. 6 through 8.

Referring now to FIGS. 13 and 14, the presently preferred embodiment of this invention is shown to highlight further improvements and advantages provided by insertion indicators and female housings designed in accordance with this invention. Female housing member 16 is modified compared to the female housing member illustrated in FIGS. 1–5. Insertion indicator 10 is also modified compared to that shown in FIGS. 1–12. The further inventive features associated with the presently preferred embodiment will now be described.

Enlarged end 28 of female element 16 is modified such that the modified insertion indicator 10 is disposed substantially within female element housing 16. In order to facilitate nesting of insertion indicator 10 within female housing 16, end 200 defines a shoulder 202. Shoulder 202 is defined by radially extending bearing surface 204 and circumferential surface 206. When properly positioned within female housing element 16, insertion indicator 10 is nested within end 200 such that generally annular indicator member 218 is automatically centered and disposed substantially within housing member 16 and outer surface 219 on indicator member 218 is in line with surface 201 of end 200 as shown in the drawings.

Generally annular indicator member 218 includes an outer surface 210 defined by a largest outer diameter of indicator 10 that is slightly smaller than the inner diameter of surface 206 on housing member 16. Indicator member 218 also includes abutment surface 212 that bears against bearing surface 204 in housing member 16. The abutment between surfaces 212 and 204 enables indicator member 218 to function in accordance with the description given above with respect to FIGS. 1–12. Upon proper engagement of the male element into female housing element 16, bearing surface 204 prevents axial displacement of indicator member 218 inward into housing member 16 beyond the point of bearing surface 204. The radial length of bearing surface 204 and that portion of abutment surface 212 that cooperates with it are preferably long enough such that engagement of a male member into female housing element 16 does not permit indicator member 218 to undesirably protrude axially inward into housing element 16.

Further, indicator member 218 preferably is a complete ring or, more preferably includes a gap 219 bridged to provide a closed ring with a predetermined weakened point. The bridged gap facilitates removing member 218 from around a conduit after proper coupling.

Indicator member 10 is further modified from that illustrated in FIGS. 1–12. A radial projection or rib 220 is provided on each of leg members 114 and 116. Radial projections 220 cooperate with notches or radially defined grooves 230 within housing member 16. The cooperation between ribs 220 and notches 230 prevents undesirable axial movement of indicator 10 relative to housing 16 until proper coupling of a male element within female element 16. Radial projections 220 are preferably designed to prevent undesirable axial movement of indicator 10 relative to housing 16 while not preventing the desirable movement of legs 114 and 116 along with base member 112 toward seat 38 upon proper engagement of a male member in accordance with the description above in reference to FIGS. 1–12.

The nested feature including annular indicator member 218 being substantially disposed within female housing element 16 provides several advantages. First, it has been found that during shipment or storage of a plurality of quick connector assemblies 12, the distal barbed end of one female element 16 may become entangled with the enlarged receiving end 28 of another thereby rendering the tangled female housing elements and retainer assemblies unusable.

Further, when undesirable axial play exists between the indicator 10 and housing 16 it is possible for something to become lodged between the indicator member 10 and the end 28 of female housing element 16. Undesirable obstructions, even if minor, can interfere with proper coupling and indication as detailed above. Moreover, the embodiments illustrated in FIGS. 1–12 include the possibility that generally annular indicator member 118 can become partially or completely detached during shipment. The nested feature of the preferred embodiment of this invention overcomes this difficulty and the provision of the radial projections on legs 114 and 116 further prohibit undesirable axial play between the housing element and indicator 10 to thereby maintain the nested feature and avoid undesirable interference in accurate insertion indication or entanglement during shipment or storage.

Female housing element 16 is further modified in accordance with the presently preferred embodiment to avoid the undesirable entanglement just described. The end of female housing element 16 that is most distal from the male element includes an improved barbed design 240. The first barb 242 is provided with an elongated edge that extends axially along housing element 16 a distance great enough to prevent a barb from becoming entangled within the retainer 18 of the partially assembled connector assembly 12. For example, it can be appreciated from the drawings in FIG. 1 and FIG. 5 that the most distal barb 26 on female element 16 could become inserted within the enlarged end 28 of a second female housing element and become entangled with a retainer 18 within that second female housing element. The elongated barb 242 in FIG. 13 prevents such undesirable entanglement by not allowing any surface to but up against or become caught on abutment surfaces such as 60 and 62 shown in FIG. 2.

The improvements shown in the preferred embodiment illustrated in FIG. 13 further facilitate proper coupling of male and female elements and resilient tubing as may be desired. Nesting the indicator 10 within or substantially within the female housing element 16 ensures proper coupling of the male and female elements without undesirable entanglement or deformation of the indicator member 10 prior to proper engagement.

Now referring to FIG. 15, a portion of female housing element 16 is illustrated to highlight features of elongated barb design 240. In the presently preferred embodiment, the elongated barb 240 includes a land 250. Land 250 serves as a sealing surface yielding a greater amount of surface contact between an inner diameter on tubing and the outer diameter of housing element 16.

The increase in surface contact is a direct result of the "cylindrical" contact along land 250 contrasted with the "line" contact provided by conventional barbs such as 26.

Adjacent land 250 is a ramped surface 252. Ramped surface 252 is inclined in a manner to facilitate proper coupling between the housing element 16 and the tubing element. Land 252 preferably runs longitudinally from a terminal point 254 on female housing element 16, along the length of housing 16, and ends adjacent sealing surface 250. A first engaging surface 256 is located at an end of sealing surface 250 opposite the ramped surfaced 252. First engaging surface 256 abuts an inner diameter of a piece of tubing and provides a grip-like coupling between female housing element 16 and the tubing. First engaging surface 256 works in combination with the plurality of barbs 26 that are disposed between elongated barb 240 and a receiving end of female housing element 15.

In the most preferred embodiment, a circumferential groove 258 is provided on land 250. An O-ring 260 is preferably disposed in groove 258 to improve the seal established between housing element 16 and the tubing that it is inserted into. Groove 258 is shown having a semicircular cross-section, however, another preferred embodiment includes a rectangular cross-section for groove 258. Groove 258 can be located at any point along the longitudinal length of sealing surface 258, however, it is preferably located in the longitudinal center of land 250.

The elongated barb design 240 is especially useful in applications requiring multilayer tubing. FIG. 16 illustrates, in cross-sectional view, a piece of multilayer tubing 262. Multilayer tubing 262 includes an inner layer 264 that is formed from extruded PVDF, for example. Other materials typically used in multilayer tubing for inner layers, such as layer 264 include Teflon™ or other low permeation materials. An outer layer 266 of nylon surrounds inner layer 264. The illustrated embodiment also includes a layer of adhesive 268 interposed between inner layer 264 and outer layer 266.

FIG. 17 illustrates a portion of a piece of multilayer tubing 262 coupled with a portion of female housing element 16. As can be appreciated from the drawing, a sealing surface is maintained along a longitudinal distance L between sealing surface 250 and the inner layer 264 of multilayer tubing 262. The seal between the housing element 16 and the multilayer tubing is enhanced by the presence of O-ring 260. The seal provided by sealing surface 250 is especially advantageous when using multilayer tubing for a number of reasons.

For example, it is often difficult to establish a snug fit between the female housing element and the multilayer tubing because of the nature of the materials, such as Teflon™, that typically make up the inner layer 264. Accordingly, it becomes advantageous to use sharper barbs 26 in order to provide a better engagement between the tubing and housing element. Concomitant with the sharper barbs 26, however, comes the risk of piercing a portion of the inner layer 264. Depending on the fluids and materials present, permeation through the first layer 264 can produce undesirable chemical reactions resulting in tubing failure or the undesirable permeation of vapors from the tubing. In the illustrated embodiment, sealing surface 250 eliminates any undesirable effects otherwise presented by sharper barbs 26. As can be appreciated from the drawings, the presence of the seal along sealing surface 250 prevents any fluid from within tubing 262 from reaching areas 270 between the housing element and the tubing. Accordingly, no fuel (or other fluid within tubing 262) is able to reach a point on inner layer 264 that may be pierced or broken by barb 26. Therefore, the potential undesirable results just mentioned is avoided by this invention.

Further difficulties presented by the demand for multilayer tubing include compensating for the greater hoop strength inherent in multilayer tubing. Multilayer tubing is stiffer and has a greater hoop strength compared to conventional monowall tubing. Multilayer tubing, therefore, presents difficulties that were not previously encountered. It is difficult for a conventional barb design on a connector housing to maintain proper adhesion or gripping contact with the innermost layer of multilayer tubing because, in part, of the stiffness of the tubing. The subject elongated barb design compensates for the greater hoop strength and facilitates maintaining a proper seal between the connector housing and multilayer tubing.

Further, elongated barb design 240 facilitates easier coupling between a connector housing element 16 and tubing, especially in applications including multilayer tubing.

The foregoing description is exemplary rather than limiting in nature. Variations and modifications of the preferred embodiments discussed herein will become apparent to those skilled in the art that do not depart from the purview and spirit of this invention. The scope of the latter is to be limited only by the appended claims.

What is claimed is:

1. A connector housing for use with a quick connector assembly, comprising:

a generally cylindrical plastic housing body having a first end that is adapted to receive a male member and a second end adapted to be coupled with tubing;

said second end having an elongated barb at a terminal portion on an outer surface of said second end;

said elongated barb having a ramped surface beginning at a preselected point on said terminal portion and ending adjacent a generally cylindrical land, said land extending away from said ramped surface to a first engaging surface on said second housing end, said first engaging surface being adapted to bear against a portion of an inner surface on the tubing;

wherein said second end further comprises a plurality of longitudinally spaced barbs disposed between said first engaging surface and said housing first end and wherein said housing body first end further comprises a retainer disposed within said housing for releasably coupling the male member with said housing, said retainer having a retainer surface adapted to abuttingly engage a portion of the male member to thereby maintain a coupling between the male member and said housing, said engaging surface being defined at a first point on said second end and wherein a distance between said first point and said terminal portion is at least greater than a longitudinal distance between said housing opening and said retaining surface on said retainer.

2. A quick connector assembly, comprising:

a connector housing defining an axial opening for matingly receiving a male member; and a retainer disposed substantially within said housing for releasably coupling the male member with said connector housing, said retainer having a retaining surface adapted to abuttingly engage a portion of the male member to thereby maintain a coupling between the male member and said housing;

said connector housing having an elongated barb at a second end distal from said opening, said elongated barb defining a generally cylindrical sealing surface that is disposed adjacent a ramped surface, said ramped surface extending longitudinally between said sealing surface and a terminal point on said second end, said sealing surface having a first end adjacent said ramped surface and a second end distal from said first end defining a first engaging surface for engaging an inner surface on said tubing and wherein a longitudinal distance between said first engaging surface and said terminal point is at least greater than a longitudinal distance between said housing opening and said retaining surface on said retainer.

3. The assembly of claim 2, wherein said ramped surface is essentially conical having an essentially consistent slope along a longitudinal length of said ramped surface.

4. The assembly of claim 2, wherein said ramped surface has an outer surface with a nominal radius at said terminal point and a generally increasing diameter in a longitudinal direction toward said sealing surface, and wherein said outside surface has a varying slope along a longitudinal length of said ramped surface.

5. The assembly of claim 2, further comprising a generally circumferential groove on said sealing surface.

6. The assembly of claim 5, further comprising an o-ring disposed partially within said groove.

* * * * *

UNITED STATES PATENT AND TRADEMARK OFFICE
CERTIFICATE OF CORRECTION

PATENT NO. : 5,542,712
DATED : August 6, 1996
INVENTOR(S) : Klinger et al

It is certified that error appears in the above-indentified patent and that said Letters Patent is hereby corrected as shown below:

In column 8, line 14, please delete "170" and insert --70--.

In column 8, line 14, please delete "180" and insert --80--.

Signed and Sealed this

Sixth Day of May, 1997

Attest:

BRUCE LEHMAN

*Attesting Officer*     *Commissioner of Patents and Trademarks*